United States Patent
Shen

(10) Patent No.: US 12,299,432 B2
(45) Date of Patent: May 13, 2025

(54) METHOD AND DATA STRUCTURE FOR UPDATING FIRMWARE

(71) Applicant: Nuvoton Technology Corporation, Hsinchu (TW)

(72) Inventor: Tzu-Lan Shen, Taoyuan (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 282 days.

(21) Appl. No.: 17/854,463

(22) Filed: Jun. 30, 2022

(65) Prior Publication Data

US 2023/0315424 A1    Oct. 5, 2023

(30) Foreign Application Priority Data

Mar. 29, 2022  (TW) .................................. 111111868

(51) Int. Cl.
*G06F 8/65*    (2018.01)
*H04L 9/00*    (2022.01)

(52) U.S. Cl.
CPC .................. *G06F 8/65* (2013.01); *H04L 9/50* (2022.05); *H04L 2209/463* (2013.01)

(58) Field of Classification Search
CPC .................................................. G06F 8/63–65
See application file for complete search history.

(56) References Cited

U.S. PATENT DOCUMENTS

| | | |
|---|---|---|
| 2014/0223424 A1 | 8/2014 | Han |
| 2020/0334028 A1 | 10/2020 | Suryanarayana et al. |
| 2021/0240465 A1 | 8/2021 | Park et al. |
| 2023/0112734 A1* | 4/2023 | Suryanarayana ..... H04L 9/3247 717/170 |

FOREIGN PATENT DOCUMENTS

| | | |
|---|---|---|
| CN | 111831308 A | 10/2020 |
| TW | 201944234 A | 11/2019 |

* cited by examiner

*Primary Examiner* — Duy Khuong T Nguyen
(74) *Attorney, Agent, or Firm* — Muncy, Geissler, Olds & Lowe, P.C.

(57) ABSTRACT

A method for updating firmware is provided. The method includes dividing the firmware into a plurality of sections, and assigning the sections to a plurality of block segments. The method includes generating a firmware chain by generating a series of blocks corresponding to the block segments and creating links between the blocks, and publishing the block segments onto the firmware chain. The method includes obtaining the sections from the firmware chain, and updating the sections to a first storage bank of the target device.

18 Claims, 12 Drawing Sheets

METHOD AND DATA STRUCTURE FOR UPDATING FIRMWARE

CROSS REFERENCE TO RELATED APPLICATIONS

This application claims priority of Taiwan Patent Application No. 111111868, filed on Mar. 29, 2022, the entirety of which is incorporated by reference herein.

BACKGROUND OF THE INVENTION

Field of the Invention

The present disclosure relates in general to firmware update techniques, and it relates particularly to a method and a data structure for updating a firmware.

Description of the Related Art

FIG. 1 is a structural diagram of an online firmware update mechanism 100 that is currently used in practice. As shown in FIG. 1, in the currently-used online firmware update mechanism 100, the developed firmware is uploaded and/or published from the development-end device 101 to the server 102 by a developer, enabling local devices (e.g., the local devices 103, 104, and 105 in FIG. 1) from all over the world to download the firmware through the network. Such centralized mechanisms may face problems with network security and stability. For example, the speed and the stability of downloading may be affected by tight network bandwidths when numerous local devices are simultaneously updating their firmware. Besides, all the local devices (e.g., the local devices 103, 104, and 105 in FIG. 1) will not be able to update their firmware once the server (e.g., the server 102 in FIG. 1) malfunctions or becomes the target of a cyber-attack. Furthermore, a lack of network stability may cause interruptions and restarts of the firmware update, which results in increased power consumption. Since the lifecycle of the device whose power is supplied by a battery highly depends on how long the battery lasts, a firmware update that takes a long time may acutely impact the lifespan of the device.

In view of the above issues, there is a need for a method and a data structure for updating firmware to resolve the problems with the online firmware update mechanism that is currently in use.

BRIEF SUMMARY OF THE INVENTION

A method for updating the firmware of a target device is provided by the present disclosure. The method includes dividing the firmware into a plurality of sections, and assigning the sections to a plurality of block segments using a first electronic device. Each of the block segments includes one or more of the sections and section metadata corresponding to the one or more sections. The method includes generating a firmware chain by generating a series of blocks corresponding to the block segments and creating links between the blocks using a first electronic device, and publishing the block segments onto the firmware chain. The block includes one of the block segments and block metadata corresponding to the block segment. The method includes obtaining the sections from the firmware chain using the target device, and writing the sections to a first storage bank of the target device.

In some embodiments, the method further includes generating a new block segment by comparing the firmware to new firmware using the first electronic device. The new firmware includes one or more updated sections and the section metadata corresponding to the updated sections. The method further includes adding a new block into the firmware chain using the first electronic device by generating the new block corresponding to the new block segments and creating a new link between the new block and the last block on the firmware chain, and publishing the new block segments onto the firmware chain. The new block includes the new block segment and the block metadata corresponding to the new block segment. The method further includes using all of the section metadata obtained from the firmware chain after the new block is published to identify the updated sections using the target device, writing the updated sections from the firmware chain to a second storage bank of the target device, and writing sections other than the updated sections from the first storage bank to the second storage bank.

In some embodiments, the metadata of each section includes a section number and a first section hash value of the section.

In some embodiments, the operation of using all of the section metadata obtained from the firmware chain after the new block is published to identify the updated sections using the target device, includes calculating a second section hash value of each of the sections in the first storage bank. The operation includes for each section corresponding to each section number, comparing the first section hash value to the second section hash value. The first section hash value is the section hash value of the section obtained from the firmware chain, and the second section hash value is the section hash value of the section in the first storage bank. The operation includes determining which sections on the firmware chain have the first section hash value that is different from the second section hash value of the section in the first storage bank, and designating those sections on the firmware chain as the updated sections.

In some embodiments, the updated section is generated by modifying one of the sections of the firmware, or the updated section is added to the sections of the firmware.

In some embodiments, the method further includes configuring the first storage bank to be in an active state and configuring the second storage bank to be in an inactive state using the target device, in response to the sections being written to the first storage bank of the target device. The method further includes configuring the first storage bank to be in an inactive state and configuring the second storage bank to be in an active state using the target device, in response to the updated sections being written to the second storage bank of the target device and sections other than the updated sections being written from the first storage bank to the second storage bank.

In some embodiments, the metadata of each section includes a section offset, a section starting address, and a section ending address of the section that corresponds to the section metadata.

In some embodiments, the metadata of each block includes the block hash value of the previous block.

In some embodiments, the block metadata includes information for consensus computation.

In some embodiments, the firmware chain is stored in a distributed network architecture including a plurality of second electronic devices.

A data structure product for updating the firmware of a target device is provided by the present disclosure. The data structure product includes a firmware chain. The firmware chain includes a series of blocks. The block includes a block segment and block metadata corresponding to the block segment. The firmware has a plurality of sections, and each of the block segments comprises one or more of the sections, and section metadata corresponding to the one or more sections. The target device obtains the sections from the firmware chain, and writes the sections to a first storage bank of the target device.

In some embodiments, the firmware chain further includes a new block, and the new block includes a new block segment and block metadata corresponding to the new block segment. The new block segment includes one or more updated sections and section metadata corresponding to the updated sections. The target device uses all of the section metadata obtained from the firmware chain after the new block is published to identify the updated sections, writes the updated sections to a second storage bank of the target device, and writes sections other than the updated sections from the first storage bank to the second storage bank.

The method and the data structure product provided by the present disclosure adopt the mechanisms of firmware segmentation, firmware chain data structure, and dual-bank storage, and thereby realize the decentralization of online firmware updates, which avoids the problems regarding network security, network stability, and high power consumption of the centralized online firmware update mechanism.

BRIEF DESCRIPTION OF THE DRAWINGS

The present disclosure can be better understood by reading the subsequent detailed description and examples with references made to the accompanying drawings. Additionally, it should be appreciated that in the flow diagram of the present disclosure, the order of execution for each blocks can be changed, and/or some of the blocks can be changed, eliminated, or combined.

DETAILED DESCRIPTION OF THE INVENTION

The following description provides embodiments of the invention, which are intended to describe the basic spirit of the invention, but is not intended to limit the invention. For the actual inventive content, reference must be made to the scope of the claims.

In each of the following embodiments, the same reference numbers represent identical or similar elements or components.

Ordinal terms used in the claims, such as "first," "second," "third," etc., are only for convenience of explanation, and do not imply any precedence relation between one another.

Figure 1:
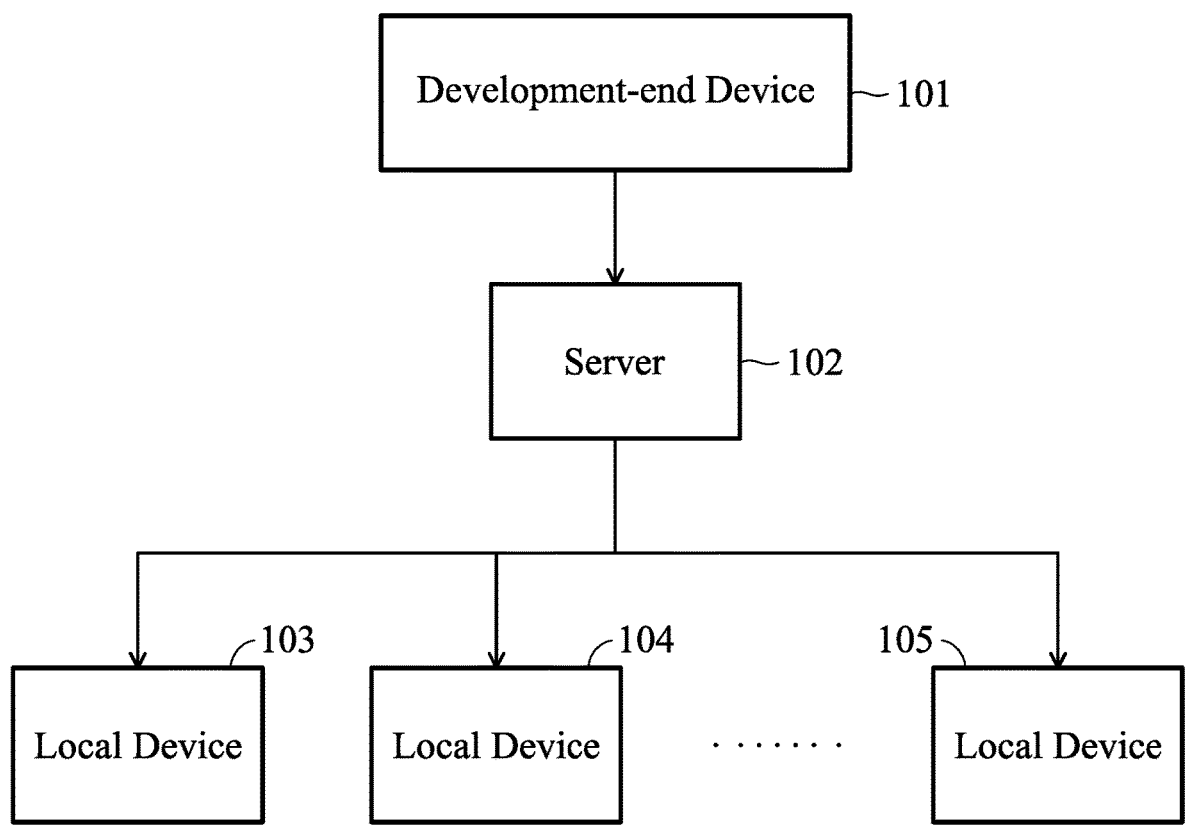
FIG. 1 is a structural diagram of an online firmware update mechanism that is currently used in practice.
Figure 2:
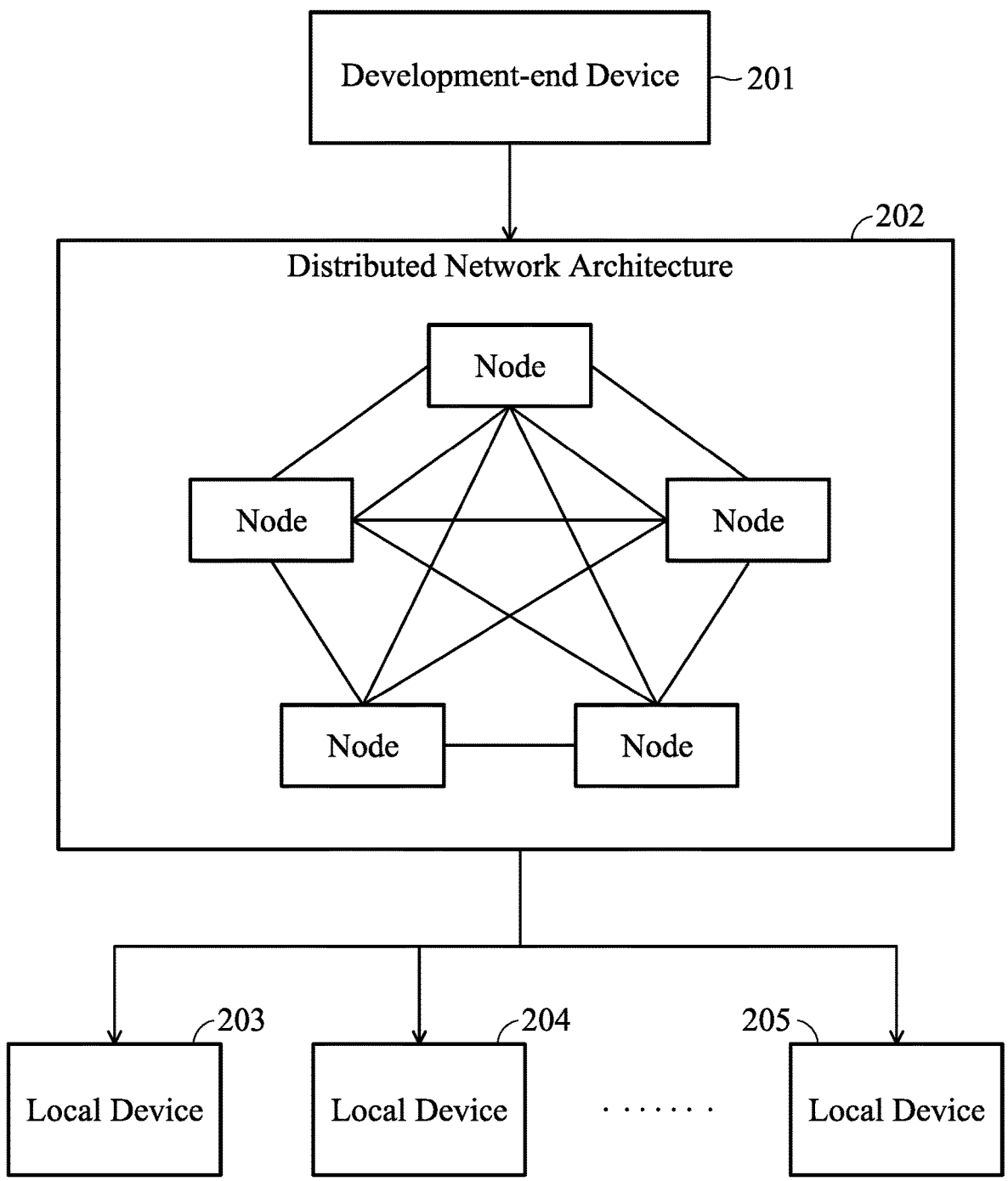
FIG. 2 is a structural diagram of a decentralized online firmware update mechanism, according to an embodiment of the present disclosure.

FIG. 2 is a structural diagram of a decentralized online firmware update mechanism 200, according to an embodiment of the present disclosure. As shown in FIG. 2, in the online firmware update mechanism 200, the developed firmware is uploaded and/or published from the development-end device 201 to a distributed network architecture 202 by a developer, enabling local devices (e.g., the local devices 203, 204, and 205 in FIG. 2) from everywhere to download the firmware through network. The decentralized online firmware update mechanism 200 can avoid the problems regarding network security, network stability, and high power consumption of the online firmware update mechanism 100 as previously described.

In general, embodiments of the present disclosure may include mechanisms of firmware segmentation, firmware chain data structure, and dual-bank storage, for realizing the decentralization of online firmware update and protecting the firmware data from being tampered with. Firmware segmentation is directed to dividing the firmware into sections having a fix size, and the generation of the updated sections. The firmware chain data structure is directed to a block-chain like data structure that is used when the firmware is published onto the network. Dual-bank storage is directed to using two storage banks to alternately store the newest firmware in one of the two storage banks, and determining if each of the sections should be obtained from a storage bank in the local device or should be obtained from the firmware.

Figure 3:
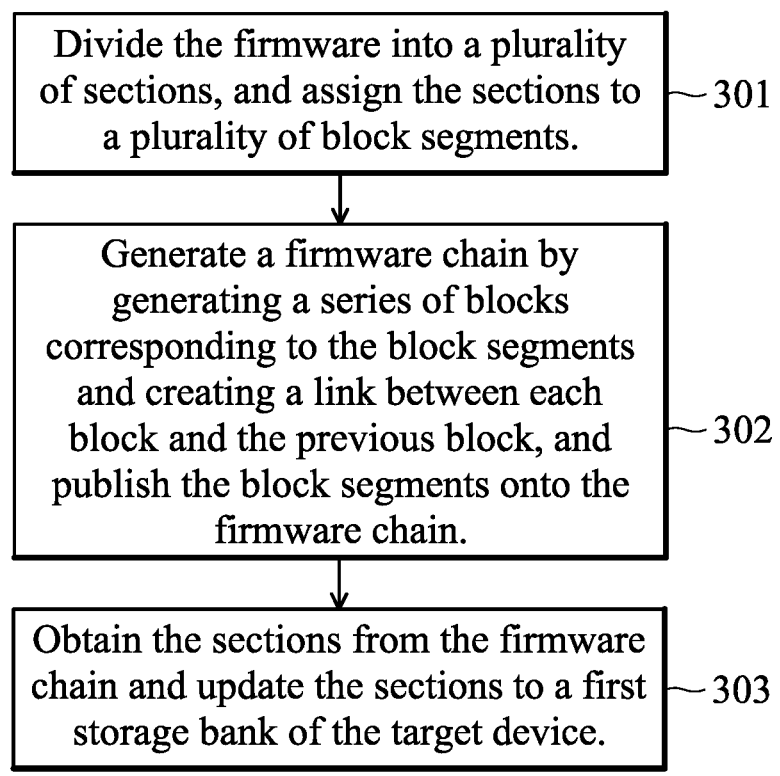
FIG. 3 is a flow diagram of a method for updating a first version of firmware, according to an embodiment of the present disclosure.

FIG. 3 is a flow diagram of a method 300 for updating a first version of firmware, according to an embodiment of the present disclosure. As shown in FIG. 3, method 300 may include operations 301-303.

In operation 301, the firmware is divided into a plurality of sections, and the sections are assigned to a plurality of block segments using the first electronic device. Each of the block segments may include one or more of the sections and the corresponding section metadata. Then, method 300 proceeds to operation 302.

The first electronic device described herein refers to the device used by the developer while programming the firmware, such as the development-end device 201 in FIG. 2. Typically, the first electronic device may include a processor and a storage medium. The processor can be any device used for executing instructions, such as a central processing unit (CPU), a microcontroller, or a state machine. The storage medium can be random access memory (RAM), read-only memory (ROM), electrically-erasable programmable read-only memory (EEPROM), flash memory or other memory technologies, compact disc read-only memory (CD-ROM), digital versatile disc (DVD) or other optical storage devices, magnetic disk, hard disk drive (HDD) or other magnetic storage devices, or any other storage media accessible to the processor for storing required information.

Figure 4A:
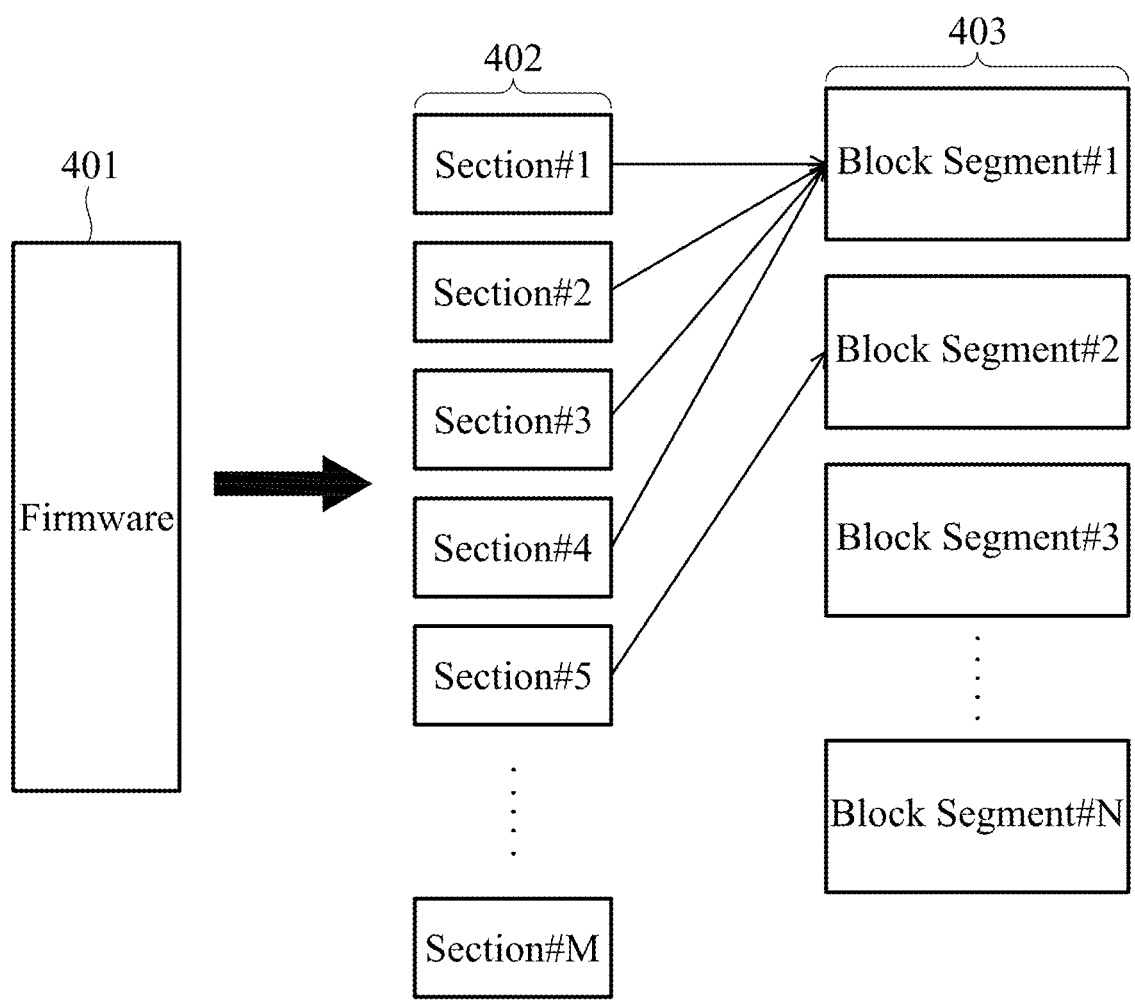
FIG. 4A is a schematic diagram of exemplary operations of firmware segmentation, according to an embodiment of the present disclosure.

FIG. 4A is a schematic diagram of operation 301 in FIG. 3, according to an embodiment of the present disclosure. As shown in FIG. 4A, in operation 301, the firmware 401 is divided into M sections 402, namely Section #1. Section #2, Section #3 . . . , and Section #M. Each of the sections have the same size (4 bits, for example, but the present disclosure is not limited thereto). Furthermore, the M sections 402 are assigned to N block segments 403, namely Block Segment #1, Block Segment #2, Block Segment #3 . . . , and Block Segment #N. In the example of FIG. 4A, Section #1, Section #2, Section #3, and Section #4 are assigned to Block Segment #1.

Figure 4B:
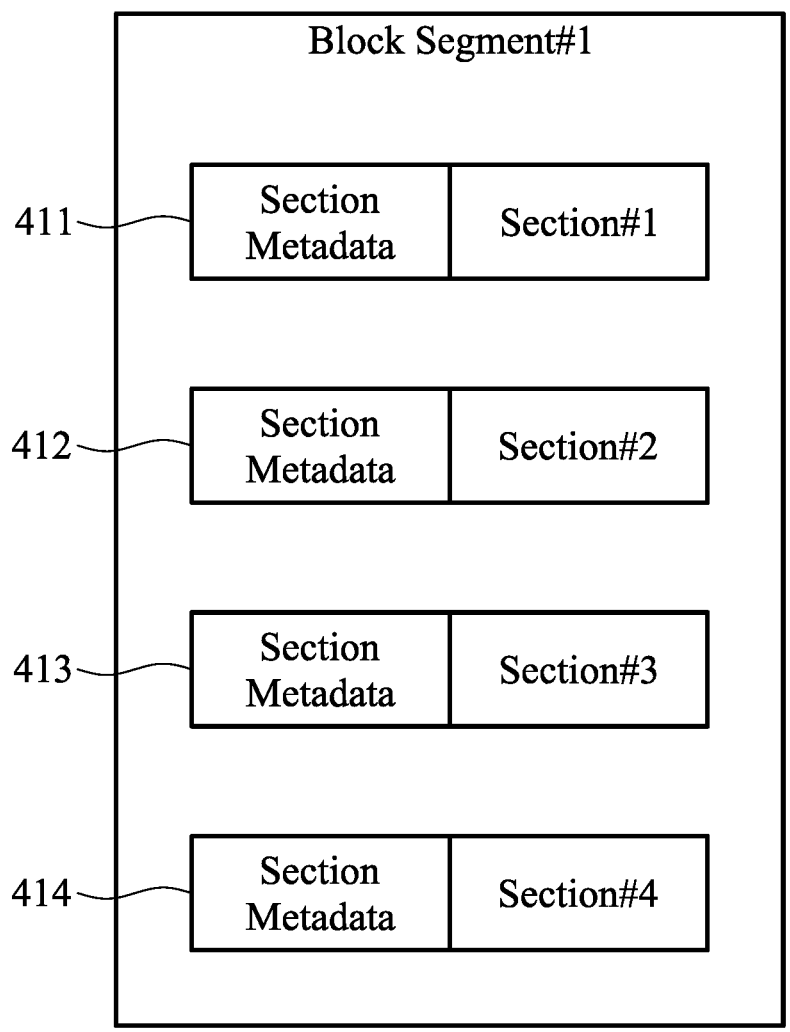
FIG. 4B is a schematic diagram of an exemplary block segment.

FIG. 4B is a schematic diagram of the exemplary Block Segment #1 in FIG. 4A. As shown in FIG. 4B, Block Segment #1 includes Section #1, Section #2, Section #3. Section #4, and the section metadata 411-414 corresponding to Section #1, Section #2, Section #3, and Section #4 respectively.

In some embodiments, the section metadata (e.g., the section metadata 411-414 in FIG. 4B) may include a section number and a section hash value of the section (e.g., Section #1, Section #2, Section #3, or Section #4 in FIG. 4B) corresponding to the section metadata. The section number is used as an identifier (ID) of the section. The section hash value is a value generated by encoding the section using particular functions or algorithms (referred to as hash functions/algorithms). The section hash value is used as a fingerprint of the section for verifying if the data of the section has been modified. The hash functions/algorithms can be SHA series (e.g., SHA0, SHA1, SHA256, SHA512, SHA3), MD series (e.g., MD2, MD4, MD5), BLAKE series (e.g., BLAKE, BLAKE2), or other hash functions/algorithms, but the present disclosure is not limited thereto.

In some embodiments, the section metadata (e.g., the section metadata 411-414 in FIG. 4B) may further include a section offset, a section starting address, and a section ending address. The section offset is used for indicating the position of the section on the firmware chain. The section starting address and the section ending address are used for labeling the actual location of the section in the memory. Such design facilitates depicting the change in firmware in a sequential block chain.

Refer again to FIG. 3, in operation 302, a firmware chain is generated using the first electronic device by generating a series of blocks corresponding to the block segments and creating a link between each block and the previous block, and the block segments are published onto the firmware chain. The block includes one of the block segments and block metadata corresponding to the block segment. Then, method 300 proceeds to operation 303.

Figure 5:
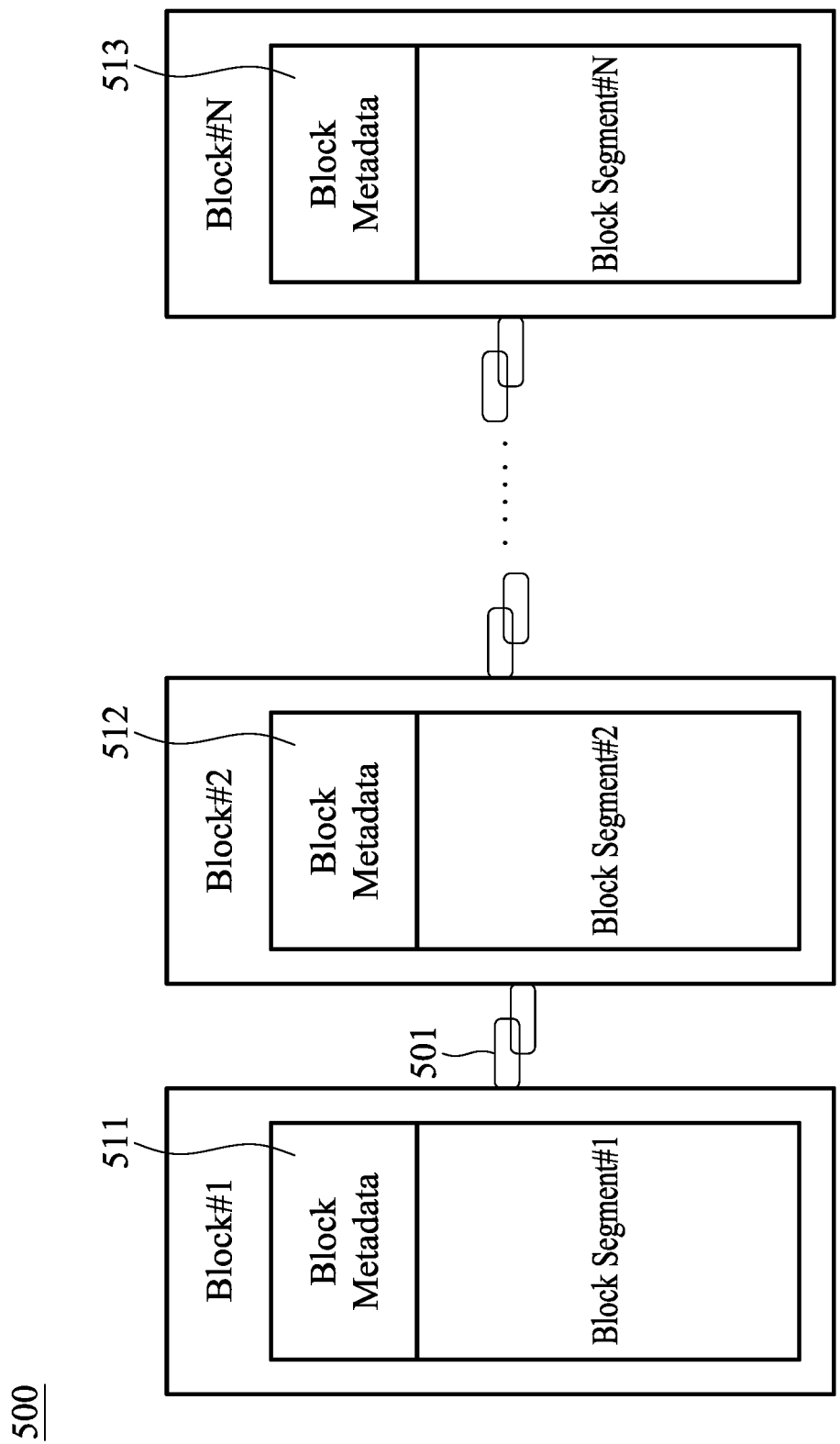
FIG. 5 is a schematic diagram of an exemplary firmware chain, according to an embodiment of the present disclosure.

FIG. 5 is a schematic diagram of an exemplary firmware chain 500 generated in operation 302 of FIG. 3, according to an embodiment of the present disclosure. As shown in FIG. 5, the firmware chain 500 may include a series of blocks (i.e., Block #1, Block #2 . . . , and Block #N), respectively corresponding to N block segments 403 (i.e., Block Segment #1, Block Segment #2 . . . , and Block Segment #N) in FIG. 4A. Each of the blocks includes the corresponding block segment, and the block metadata corresponding to the block segment. For example, Block #1 includes Block Segment #1 and the block metadata 511 corresponding to the Block Segment #1. Block #2 includes Block Segment #2 and the block metadata 512 corresponding to the Block Segment #2. Block #N includes Block Segment #N and the block metadata 513 corresponding to the Block Segment #N. Furthermore, there is a link between each block (except for Block #1, because it is the first block in the firmware chain 500) and the previous block. For example, there is a link 501 between Block #2 and the previous block (i.e., Block #1). The link may be a pointer that points to the next block. For example, the link 501 is a pointer that points to Block #2.

In some embodiments, the block metadata may include the block hash value of the block that immediately precedes the corresponding block, to protect the data from being tampered with. For example, the block metadata 512 may include the block hash value of the block (i.e., Block #1) that immediately precedes Block #2. The block hash value is a value generated by encoding the block using particular functions or algorithms (referred to as hash functions/algorithms). The block hash value is used as a fingerprint of the block for verifying if the data of the block has been modified. The hash functions/algorithms can be SHA series (e.g., SHA0, SHA1, SHA256, SHA512, SHA3), MD series (e.g., MD2, MD4, MD5), BLAKE series (e.g., BLAKE, BLAKE2), or other hash functions/algorithms, but the present disclosure is not limited thereto.

In some embodiments, the block metadata may further include information for consensus computation, such as the target difficulty of the Proof-of-Work (PoW) algorithm corresponding to the block, the Nonce parameter used in PoW computation, and/or parameters required for other consensus algorithms like Proof-of-Stake (PoS), Delegated-Proof-of-Stake (DPoS), Proof-of-Capacity (PoC) . . . , etc.

In some embodiments, the firmware chain 500 is stored in a distributed network architecture including a plurality of nodes (or servers), such as the distributed network architecture 202 shown in FIG. 2. The distributed network architecture may be connected to the first electronic device via network, enabling developers to upload the firmware chain 500 to the nodes (or servers) in the distributed network architecture. Typically, each node (or server) may include a processor and a storage medium. The processor can be any device used for executing instructions, such as a central processing unit (CPU), a microcontroller, or a state machine. The storage medium can be random access memory (RAM), read-only memory (ROM), electrically-erasable programmable read-only memory (EEPROM), flash memory or other memory technologies, compact disc read-only memory (CD-ROM), digital versatile disc (DVD) or other optical storage devices, magnetic disk, hard disk drive (HDD) or other magnetic storage devices, or any other storage media accessible to the processor for storing required information.

Refer again to FIG. 3, in operation 303, the sections are obtained from the firmware chain and written to a first storage bank of the target device.

The target device described herein refers to the local device that stores and runs the firmware, such as the local devices 203-205 shown in FIG. 2. Similar to the first electronic device, typically the target device may include a processor and a storage medium. The processor can be any device used for executing instructions, such as a central processing unit (CPU), a microcontroller, or a state machine. The storage medium can be random access memory (RAM), read-only memory (ROM), electrically-erasable programmable read-only memory (EEPROM), flash memory or other memory technologies, compact disc read-only memory (CD-ROM), digital versatile disc (DVD) or other optical storage devices, magnetic disk, hard disk drive (HDD) or other magnetic storage devices, or any other storage media accessible to the processor for storing required information. The first storage bank, as well as the second storage bank that will be described hereinafter, are both a part of storage space provided by the storage medium.

In an embodiment, the target device (e.g., the target devices 203-205 in FIG. 2) may communicates with the distributed network architecture (e.g., the distributed network architecture 202 in FIG. 2) storing the firmware chain (e.g., the firmware chain 500 in FIG. 5) via network, so as to obtain the sections (e.g., the M sections 402 in FIG. 4A) of the firmware from the firmware chain. The network can be, for example, local area network (LAN), wide area network (WAN), virtual private network (VPN), internet, intranet, extranet, public switched telephone network, infrared network, wireless network, or any combination thereof.

Figure 6:
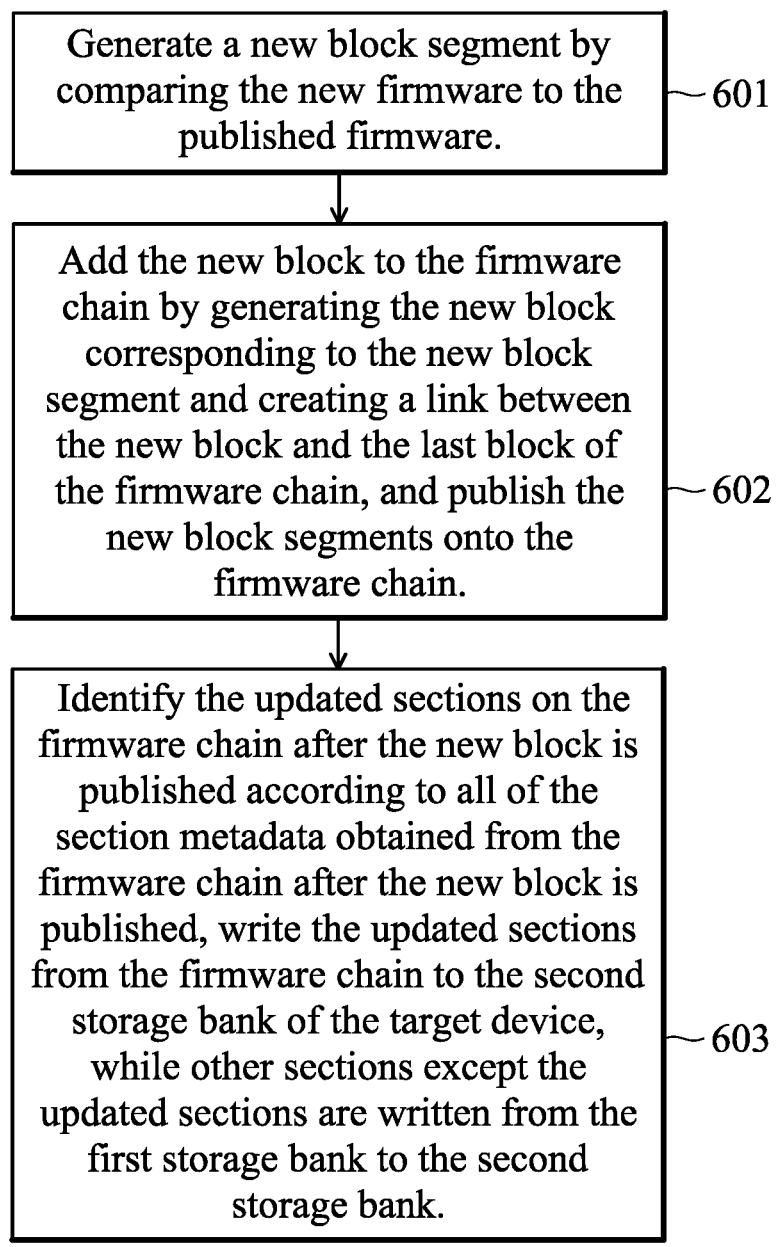
FIG. 6 is a flow diagram of a method for updating firmware that is not the first version, according to an embodiment of the present disclosure.

FIG. 6 is a flow diagram of a method 600 for updating firmware that is not the first version, according to an embodiment of the present disclosure. As shown in FIG. 6, the method 600 includes operations 601-603.

In operation 601, a new block segment is generated using the first electronic device by comparing the new firmware to the published firmware. The new block segment includes one or more updated sections and the corresponding section metadata. Then, the method 300 proceeds to operation 602.

In some embodiments, the updated section may include the sections of the new firmware that are different (modified or newly added) from the sections of the published firmware. In other words, the updated section is generated by modifying one of the sections of the published firmware, or the updated section is added to the sections of the published firmware.

Figure 7A:
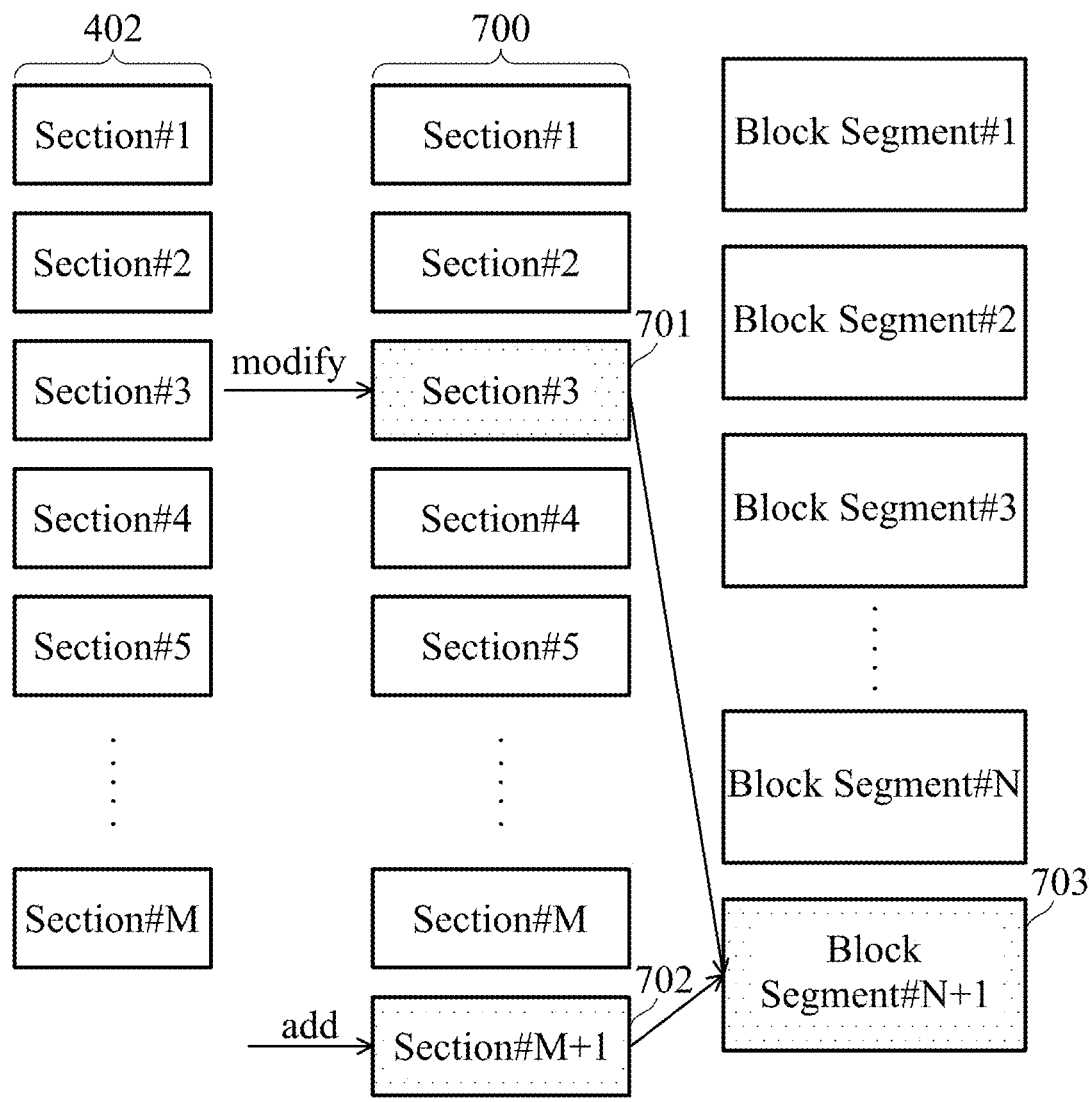
FIG. 7A is a schematic diagram of exemplary operations of generating new block segments, according to an embodiment of the present disclosure.

FIG. 7A is a schematic diagram of the exemplary operation 601 in FIG. 6, according to an embodiment of the present disclosure. In the example of FIG. 7A, the updated section 701 (i.e., Section #3 among the M+1 sections 700 of the new firmware) is generated by modifying the Section #3 among the M sections 402 of the firmware 401 in FIG. 4, and the updated section 702 (i.e., Section #M+1) is added to the M sections 402. Except for the updated sections, other sections (i.e., Section #1, Section #2, Section #4, Section #5 . . . Section #M) remain the same. Then, the updated sections 701 and 702 are used for forming the new block segment 703 (i.e., Block Segment #N+1).

Figure 7B:
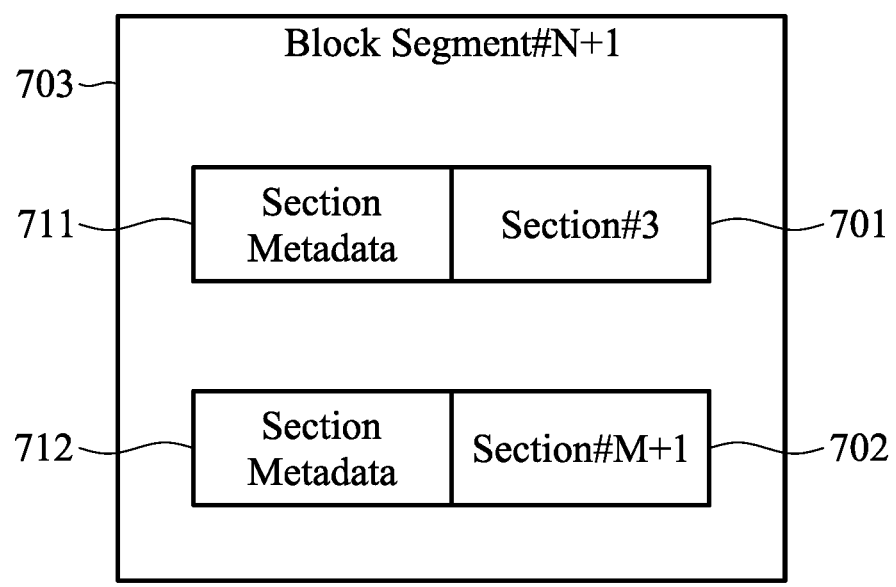
FIG. 7B is a schematic diagram of an exemplary new block segment.

FIG. 7B is a schematic diagram of the exemplary new block segment 703 in FIG. 7A. As shown in FIG. 7B, the new block segment 703 (i.e., Block Segment #N+1) includes the updated sections 701, the section metadata 711 corresponding to the updated section 701, the updated section 702, and the section metadata 712 corresponding to the updated section 702.

Refer again to FIG. 6, in operation 602, the new block is added to the firmware chain using the first electronic device by generating the new block corresponding to the new block segment and creating a link between the new block and the last block of the firmware chain, and the new block segments are published onto the firmware chain. The new block may include the new block segment, and the block metadata corresponding to the new block segment. Then, the method 600 proceeds to operation 603.

Figure 8:
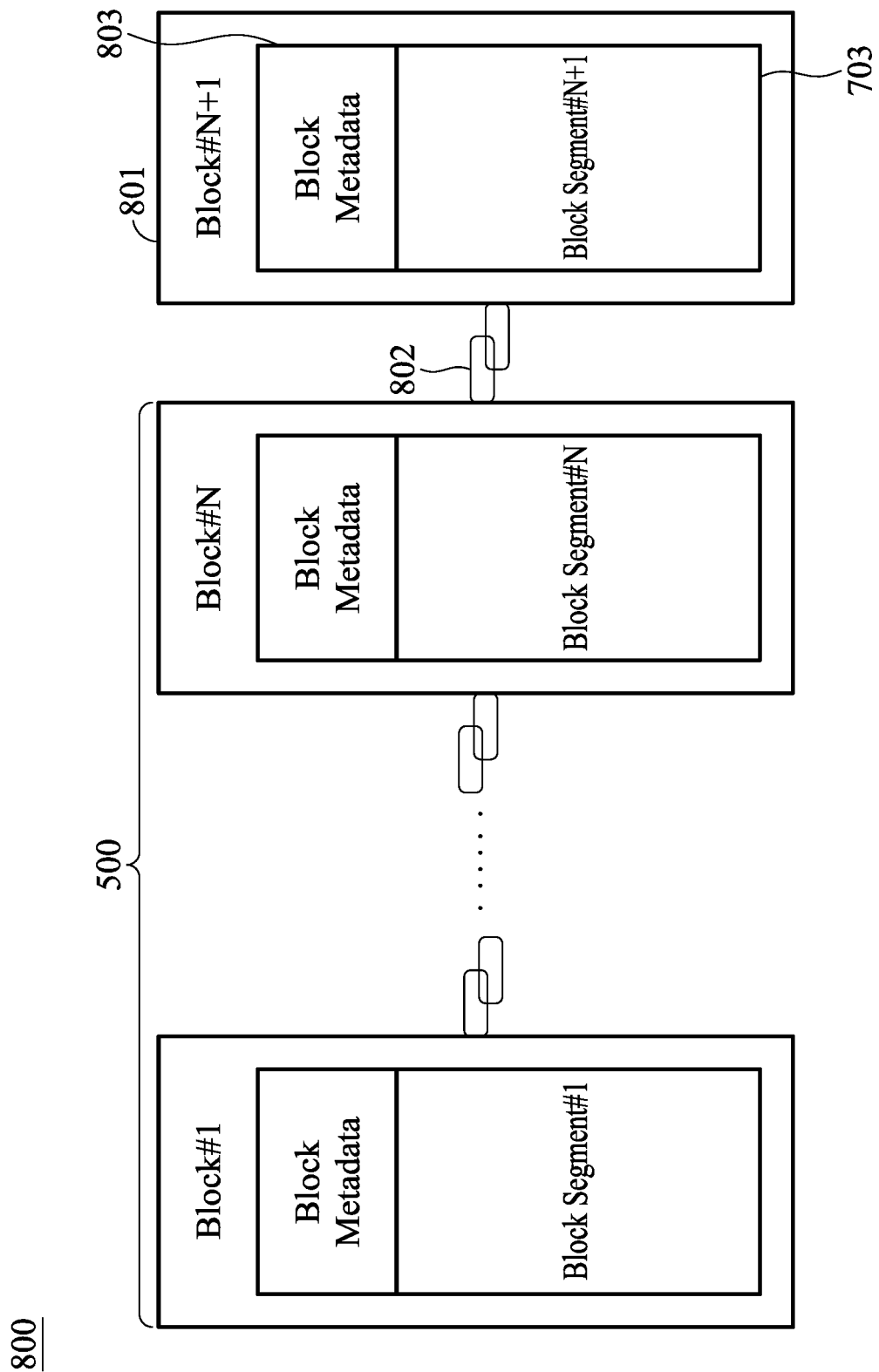
FIG. 8 is a schematic diagram of an exemplary firmware chain after adding a new block, according to an embodiment of the present disclosure.

FIG. 8 is a schematic diagram of an exemplary firmware chain 800 generated by adding a new block 801 to the firmware chain 500 in FIG. 5, according to an embodiment of the present disclosure. As shown in FIG. 8, the firmware chain 800 includes a new block 801 (i.e., Block #N+1), and a link 802 between the new block 801 and the previous block (i.e., Block #N in the firmware chain 500). The link 802 may be a pointer that points to the new block 801 (i.e., Block #N+1). The new block 801 (i.e., Block #N+1) includes the new block segment 703 (i.e., Block Segment #N+1) and the block segment metadata 803 corresponding to the new block segment 703 in FIG. 7A and FIG. 7B.

As previously discussed, in some embodiments, the block metadata 803 may include the block hash value of the new block 801's immediate predecessor (i.e., Block #N in the firmware chain 500). In some embodiments, the block metadata 803 may further include information for consensus computation, such as the target difficulty of the Proof-of-Work (PoW) algorithm corresponding to the block, and the Nonce parameter used in PoW computation. In some embodiments, the firmware chain 800 is stored in a distributed network architecture including a plurality of nodes (or servers), such as the distributed network architecture 202 shown in FIG. 2.

Refer again to FIG. 6, in operation 603, the updated sections on the firmware chain after the new block is published are identified at the target device according to all of the section metadata obtained from the firmware chain after the new block is published. Then, the updated sections are written from the firmware chain to the second storage bank of the target device, while other sections except the updated sections are written from the first storage bank to the second storage bank.

Figure 9:
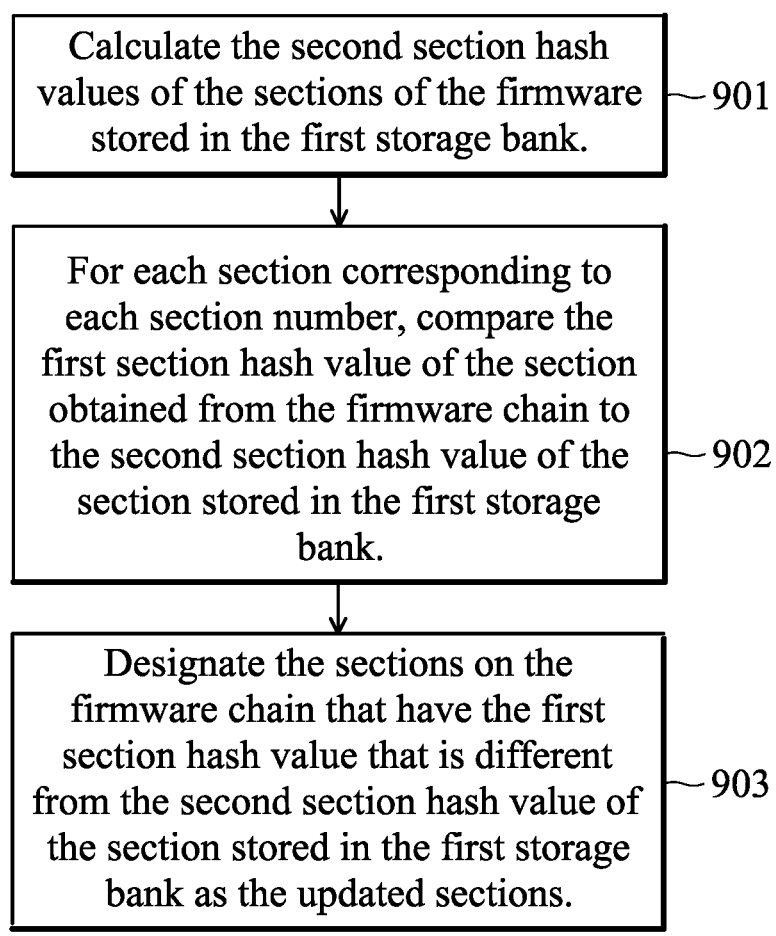
FIG. 9 is a flow diagram of a method for identifying the updated sections, according to an embodiment of the present disclosure.

FIG. 9 is a flow diagram of a method 900 for identifying the updated sections, according to an embodiment of the present disclosure. As shown in FIG. 9, the method 900 may include steps 901-903.

At step 901, the second section hash values of the sections of the firmware stored in the first storage bank are calculated. Then, the method 900 proceeds to step 902.

At step 902, for each section corresponding to each section number, the first section hash value of the section obtained from the firmware chain is compared to the second section hash value of the section stored in the first storage bank. Then, the method 900 proceeds to step 903.

At step 903, the sections on the firmware chain that have the first section hash value that is different from the second section hash value of the section stored in the first storage bank are designated as the updated sections.

In the examples as previously discussed, the Section #3 stored in the first storage bank at this time is the Section #3 among the M sections 402 in FIG. 4A and FIG. 7A, which is different from the Section #3 among the M+1 sections 700 from the firmware chain 800. Therefore, the first section hash value of Section #3 will be different from the second section hash value of Section #3, and the target device will determine Section #3 to be an updated section. Similarly, since Section #M+1 does not exist in the first storage bank, the first section hash value of Section #M+1 will be different from the second section hash value of Section #M+1, and the target device will determine Section #M+1 to be an updated section.

Figure 10:
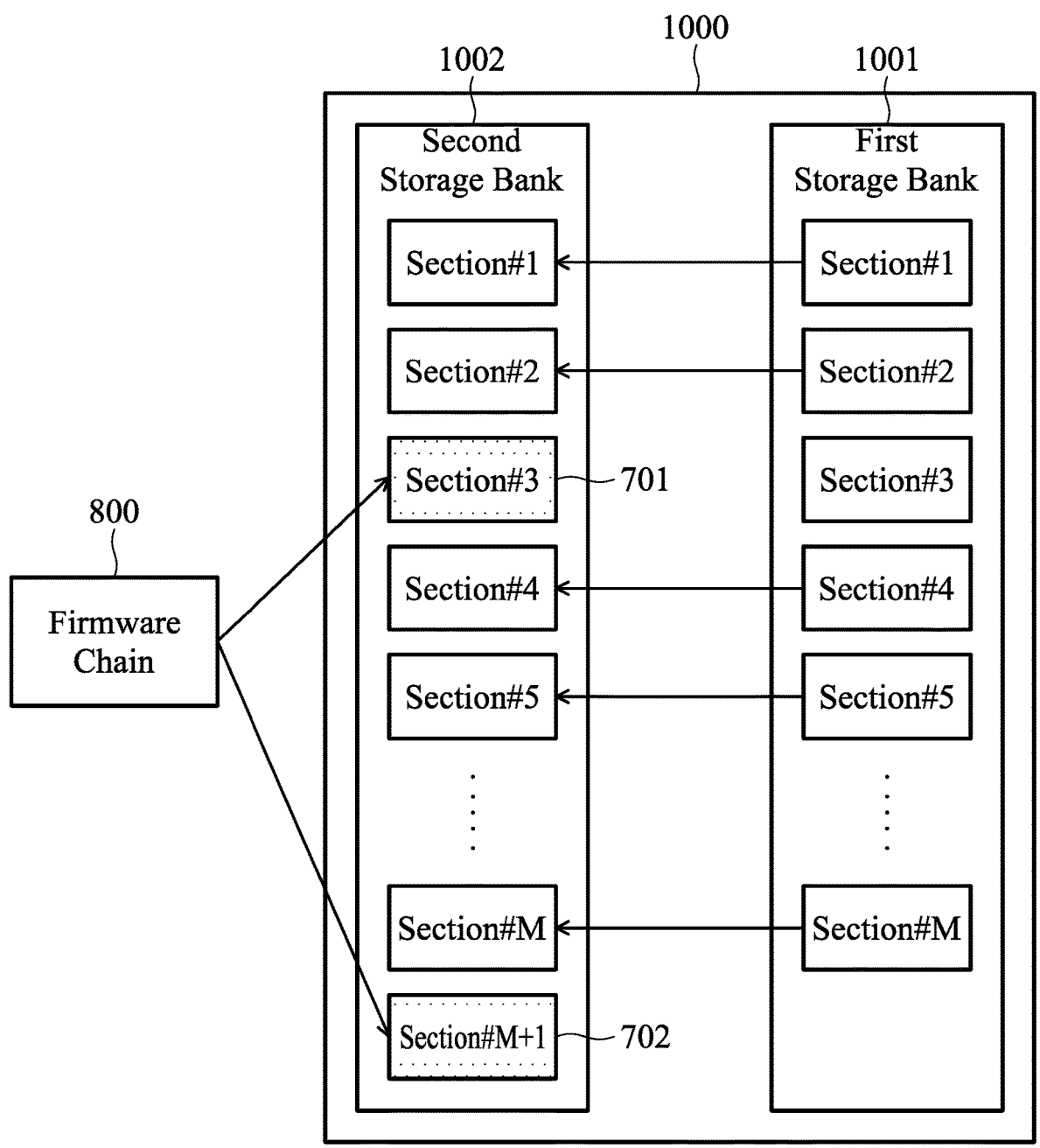
FIG. 10 illustrates exemplary operations of obtaining the updated sections from the firmware chain and obtaining other the other sections from a storage bank of the local device, according to an embodiment of the present disclosure.

FIG. 10 is a schematic diagram of the exemplary operation 603 in FIG. 6, according to an embodiment of the present disclosure. In this example, it is assumed that the target device 1000 has identified the updated section 701 (i.e., Section #3) and the updated section 702 (i.e., Section #M+1). As shown in FIG. 10, the target device 1000 may write the updated section 701 (i.e., Section #3) and the updated section 702 (i.e., Section #M+1) from the firmware chain 800 to the second storage bank 1002, and write the other sections (i.e., Section #1, Section #2, Section #4, Section #5 . . . , and Section #M) from the first storage bank to the second storage bank 1002. It should be noted that in FIG. 10, even though the updated section 701 (i.e., Section #3) is drawn between Section #2 and Section #4, and the updated section 702 (i.e., Section #M+1) is drawn below Section M, the location of the updated section in the second storage bank 1002 is not limited by the present disclosure. For example, the updated section 701 (i.e., Section #3) and the updated section 702 (i.e., Section #M+1) may be both between Section #2 and Section #4, or may be both below Section #M+1.

In some embodiments, the target device may configure the first storage bank to be in an active state and configure the second storage bank to be in an inactive state, in response to the sections of the firmware being written to the first storage bank of the target device. Conversely, the target device may configure second storage bank to be in an active state and configure the first storage bank to be in an inactive state, in response to the sections of the firmware being written to the second storage bank of the target device. Sections of the firmware stored in the storage bank in an active state will be loaded when the target device runs the firmware.

The method and the data structure product provided by the present disclosure adopt the mechanisms of firmware segmentation, firmware chain data structure, and dual-bank storage, and thereby realize the decentralization of online firmware updates, which avoids the problems regarding network security, network stability, and high power consumption of the centralized online firmware update mechanism.

The above paragraphs are described with multiple aspects. Obviously, the teachings of the specification may be performed in multiple ways. Any specific structure or function disclosed in examples is only a representative situation. According to the teachings of the specification, it should be noted by those skilled in the art that any aspect disclosed may be performed individually, or that more than two aspects could be combined and performed.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for updating firmware of a target device, comprising:
dividing the firmware into a plurality of sections, and assigning the sections to a plurality of block segments using a first electronic device, wherein each of the block segments comprises one or more of the sections and section metadata corresponding to the one or more sections;
generating a firmware chain by generating a series of blocks corresponding to the block segments and creating links between the blocks using a first electronic device, and publishing the block segments onto the firmware chain, wherein each block comprises one of the block segments and block metadata corresponding to the block segment;
obtaining the sections from the firmware chain using the target device, and writing the sections to a first storage bank of the target device;
generating a new block segment by comparing the firmware to new firmware using the first electronic device, wherein the new firmware comprises one or more updated sections and the section metadata corresponding to the updated sections;
adding a new block into the firmware chain using the first electronic device by generating the new block corresponding to the new block segments and creating a new link between the new block and the last block on the firmware chain, and publishing the new block segments onto the firmware chain, wherein the new block comprises the new block segment and the block metadata corresponding to the new block segment; and
using all of the section metadata obtained from the firmware chain after the new block is published to identify the updated sections using the target device, writing the updated sections from the firmware chain to a second storage bank of the target device, and writing sections other than the updated sections from the first storage bank to the second storage bank.

2. The method as claimed in claim 1, wherein the metadata corresponding to each section comprises a section number and a first section hash value of the section.

3. The method as claimed in claim 2, wherein using all of the section metadata obtained from the firmware chain after the new block is published to identify the updated sections using the target device comprises:
calculating a second section hash value of each of the sections in the first storage bank;
for each section corresponding to each section number, comparing the first section hash value to the second section hash value, wherein the first section hash value is the section hash value of the section obtained from the firmware chain, and the second section hash value is the section hash value of the section in the first storage bank; and
determining which sections on the firmware chain have the first section hash value that is different from the second section hash value of the section in the first storage bank, and designating those sections on the firmware chain as the updated sections.

4. The method as claimed in claim 1, wherein the updated section is generated by modifying one of the sections of the firmware, or the updated section is added to the sections of the firmware.

5. The method as claimed in claim 1, further comprising:
configuring the first storage bank to be in an active state and configuring the second storage bank to be in an inactive state using the target device, in response to the sections being written to the first storage bank of the target device; and
configuring the first storage bank to be in an inactive state and configuring the second storage bank to be in an active state using the target device, in response to the updated sections being written to the second storage bank of the target device and sections other than the updated sections being written from the first storage bank to the second storage bank.

6. The method as claimed in claim 1, wherein the metadata of each section comprises a section offset, a section starting address, and a section ending address of the section that corresponds to the section metadata.

7. The method as claimed in claim 1, wherein the metadata of each block comprises the block hash value of the previous block.

8. The method as claimed in claim 1, wherein the block metadata comprises information for consensus computation.

9. The method as claimed in claim 1, wherein the firmware chain is stored in a distributed network architecture including a plurality of second electronic devices.

10. A data structure product, embodied on a first electronic device for updating firmware of a target device, comprising:

a firmware chain, comprising a series of blocks;

wherein each of the blocks comprises a block segment and block metadata corresponding to the block segment; and wherein the firmware has a plurality of sections, and each of the block segments comprises one or more of the sections, and section metadata corresponding to the one or more sections; and wherein the target device obtains the sections from the firmware chain, and writes the sections to a first storage bank of the target device;

wherein the firmware chain further comprises a new block, and the new block comprises a new block segment and block metadata corresponding to the new block segment;

wherein the new block segment comprises one or more updated sections and section metadata corresponding to the updated sections;

wherein the new block segment is generated by comparing the firmware to new firmware; and wherein the target device uses all of the section metadata obtained from the firmware chain after the new block is published to identify the updated sections, writes the updated sections to a second storage bank of the target device, and writes sections other than the updated sections from the first storage bank to the second storage bank.

11. The data structure product as claimed in claim 10, wherein the metadata corresponding to each section comprises a section number and a first section hash value of the section.

12. The data structure product as claimed in claim 11, wherein the target device identifies the updated sections on the firmware chain by executing the following operations:

calculating a second section hash values of each section in the first storage bank;

for each section corresponding to each section number, comparing the first section hash value to the second section hash value, wherein the first section hash value is the section hash value of the section obtained from the firmware chain, and the second section hash value is the section hash value of the section in the first storage bank; and determining which sections on the firmware chain have the first section hash value that is different from the second section hash value of the section in the first storage bank, and designating those sections on the firmware chain as the updated sections.

13. The data structure product as claimed in claim 10, wherein the updated section is generated by modifying one of the sections of the firmware, or the updated section is added to the sections of the firmware.

14. The data structure product as claimed in claim 10, wherein the target device configures the first storage bank to be in an active state and configures the second storage bank to be in an inactive state, in response to the sections being written to the first storage bank of the target device; and wherein the target device configures the first storage bank to be in an inactive state and configures the second storage bank to be in an active state, in response to the updated sections being written to the second storage bank of the target device and sections other than the updated sections being written from the first storage bank to the second storage bank.

15. The data structure product as claimed in claim 10, wherein the metadata of each section comprises a section offset, a section starting address, and a section ending address of the section that corresponds to the section metadata.

16. The data structure product as claimed in claim 10, wherein the metadata of each block comprises the block hash value of the previous block.

17. The data structure product as claimed in claim 10, wherein the block metadata comprises information for consensus computation.

18. The data structure product as claimed in claim 10, wherein the firmware chain is stored in a distributed network architecture including a plurality of second electronic devices.

* * * * *